(12) United States Patent
Stephens et al.

(10) Patent No.: US 12,236,004 B2
(45) Date of Patent: Feb. 25, 2025

(54) BIOCYBERNETIC DE-ESCALATION TRAINING SYSTEM

(71) Applicant: UNITED STATES OF AMERICA AS REPRESENTED BY THE ADMINISTRATOR OF NASA, Washington, DC (US)

(72) Inventors: Chad L. Stephens, Poquosson, VA (US); John Edison Munoz Cardona, Waterloo (CA); Alan T. Pope, Poquoson, VA (US); Marsha J. Turner, Chapel Hill, NC (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 18/515,815

(22) Filed: Nov. 21, 2023

(65) Prior Publication Data

US 2024/0168544 A1 May 23, 2024

Related U.S. Application Data

(60) Provisional application No. 63/437,232, filed on Jan. 5, 2023, provisional application No. 63/426,914, filed on Nov. 21, 2022.

(51) Int. Cl.
*G06F 3/01* (2006.01)
(52) U.S. Cl.
CPC ............ *G06F 3/011* (2013.01); *G06F 3/015* (2013.01); *G06F 2203/011* (2013.01)

(58) Field of Classification Search
CPC .......... G06F 3/011; G06F 3/015; G06F 3/017; G06F 2203/011; G09B 19/00
See application file for complete search history.

(56) References Cited

U.S. PATENT DOCUMENTS 8,628,333 B2   1/2014   Prinzel, III et al.
9,084,933 B1   6/2015   Pope et al.
(Continued)

OTHER PUBLICATIONS

Producing Bias-Free Policing A Science-Based Approach, SpringerLink, https/link.springer.com/bool/10.1007/978-3-319-33175-1, pp. 1-3.
(Continued)

*Primary Examiner* — Patrick F Marinelli
(74) *Attorney, Agent, or Firm* — Matthew R. Osenga; Shawn P. Gorman; Robin W. Edwards (57) ABSTRACT

Methods and systems are described for delivering psychophysiological self-regulation training in a virtual, augmented, and/or mixed reality environment that simulates a social situation, such as one involving conflict. A user (e.g., a trainee) may interface with a training computing system directly or via an avatar that may interact with other characters in the simulation who may be programmed at one or more levels of threat to or cooperation with the trainee. The system may provide feedback to the trainee regarding their cognitive and emotional states. The feedback may be designed to encourage them to develop the ability to respond in future real environments with appropriately effective states, where the feedback may take the form of the behavior of the characters, with the trainee's interaction based on their effective states being rewarded by desirable character behavior and the trainee's ineffective states being penalized by undesirable character behavior.

15 Claims, 3 Drawing Sheets

(56) References Cited

U.S. PATENT DOCUMENTS

| | | | |
|---|---|---|---|
| 9,283,468 B2 | 3/2016 | Prinzel, III et al. | |
| 10,192,173 B2 | 1/2019 | Stephens et al. | |
| 11,006,874 B2 * | 5/2021 | Jayaraman | A61B 5/0205 |
| 11,014,000 B2 * | 5/2021 | Koyama | A63F 13/211 |
| 11,416,128 B2 * | 8/2022 | Harmon | H04N 21/6582 |
| 11,790,303 B2 * | 10/2023 | Minter | G06Q 10/105 705/7.14 |
| 12,014,750 B2 * | 6/2024 | Shastry | G10L 15/1815 |
| 2019/0329136 A1 * | 10/2019 | Koyama | A63F 13/55 |
| 2019/0341033 A1 * | 11/2019 | Hammons | G06F 3/167 |
| 2020/0193857 A1 | 6/2020 | Stephens et al. | |
| 2022/0121720 A1 * | 4/2022 | Bayliss | G06F 16/958 |
| 2022/0155850 A1 * | 5/2022 | Kodeih | G06F 3/011 |
| 2022/0189501 A1 * | 6/2022 | Shastry | G10L 15/1815 |
| 2022/0245557 A1 * | 8/2022 | Minter | G06N 20/00 |
| 2023/0214007 A1 * | 7/2023 | Dabush | G02B 27/0093 345/156 |
| 2024/0143094 A1 * | 5/2024 | Harvey | G06F 3/038 |
| 2024/0168544 A1 * | 5/2024 | Stephens | G06F 3/011 |

OTHER PUBLICATIONS

What works to reduce police brutality, Psychologists' research is pinpointing the factors that lead to overly aggressive, biased policing- and intervention that can prevent it. https://www.apa.org/monitor/2020/10/cover-police-brutality, American Psychological Association, pp. 1-2.

Practicing emotion—regulation through biofeedback on the decision-making performance in the context of serious games: A systematic review, https://www.sciencedirect.com/science/article/pil/81875952118300260?via%3Dihub, Entertainment Computing, Science Direct, vol. 29, Mar. 2019.

Munoz, et al., "A Psychophysiological Model of Firearms Training in Police Officers: A Virtual Reality Experiment for Biocybernetic Adaptation", Frontiers in Psychology, Apr. 2020, pp. 1-14, vol. 11.

Startup NASA Feature Series, J&F Alliance, Jul. 2022, https://www.youtube.com/watch?v=hb4xSdzUBRQ.

* cited by examiner

BIOCYBERNETIC DE-ESCALATION TRAINING SYSTEM

CROSS-REFERENCE TO RELATED PATENT APPLICATION

This patent application claims the benefit of and priority to U.S. Provisional Patent Application No. 63/426,914, filed on Nov. 21, 2022 and U.S. Provisional Patent Application No. 63/437,232, filed on Jan. 5, 2023, and the contents of which are hereby incorporated by reference in their entirety for any and all non-limiting purposes. This application is also being filed concurrently with U.S. patent application Ser. No. 18/515,868, the contents of which are hereby incorporated by reference in their entirety for any and all non-limiting purposes.

STATEMENT REGARDING FEDERALLY SPONSORED RESEARCH OR DEVELOPMENT

The invention described herein was made in part by employees of the United States Government and may be manufactured and used by and for the Government of the United States for governmental purposes without the payment of any royalties thereon or therefore.

BACKGROUND

Human interaction may be impacted and/or shaped by certain traits of individuals that are affected by the person's ability to emotionally regulate their behavior. For example, a key area that psychological interventions target to ameliorate police brutality is implicit bias. Psychologists have designed and begun to deliver training programs on implicit bias to law enforcement agencies around the U.S. ("Producing Bias-Free Policing: A Science-Based Approach. (https://link.springer.com/book/10.1007%2F978-3-319-33175-1)," Springer Publishing, 2017). Studies show that people high in emotional regulation skills, among other traits, are better able to prevent implicit biases from affecting their behavior. https://www.apa.org/monitor/2020/10/cover-police-brutality). Studies have shown that the practice of emotion-regulation delivered through biofeedback in the stressful context of decision making in serious games increased the skill of emotion-regulation, which resulted in better decision performance, reaction time, and attention scores on the decision-making tasks. (https://doi.org/10.1016/j.entcom.2019.01.001) Therefore, an objective of certain embodiments disclosed herein is to provide a technology for training emotional regulation skills. The integration of virtual/augmented/mixed reality technology with physiological self-regulation training technology offers a compelling new approach for delivering emotional regulation skill training.

BRIEF SUMMARY

Aspects disclosed herein relate to biocybernetics methods and systems that may be used for training de-escalation techniques, such as in social interactions involving conflict, physiological self-awareness, and/or self-regulation of impulsiveness. Certain embodiments are directed towards training emotional regulation skills. Embodiments may invoke biocybernetic adaptation wherein a trainee interacts with an entity whose functioning and/or output changes in response to the trainee's physiological signals. In certain embodiments, the interacting entity may include a character or characters in a virtual reality environment, an augmented reality environment, and/or a mixed reality environment. Certain embodiments enable the training of physiological self-regulation skills in a simulated social environment, particularly one that involves conflict according to various implementations.

One example biocybernetics de-escalation training system comprising a plurality of electronic devices associated with a user, wherein each of the plurality of electronic devices is configurable to generate a signal that is or may be associated with a physiological response of the user. A computing device of a training system may include at least one processor and a non-transitory memory storing computer-executable instructions that, when executed, cause the computing device to receive, from at least one electronic device of the plurality of electronic devices, a first signal associated with a first physiological response of the user, identify, based on the first signal, a first physiological pattern associated with the first physiological response of the user, determine, based on a comparison of a first pattern template to the first physiological pattern, a closeness score, and cause, based on the closeness score and the first pattern template, presentation of an electronic representation of a psychophysiological stimuli via a virtualized environment.

In some cases, the first physiological response of the user comprises one or both of a cognitive response and an emotional response. In some cases, the closeness score comprises a value indicative of a proximity of a user's actual moment-to-moment physiological and/or voice activity to a desirable pattern or an undesirable pattern. As non-limiting examples, the biocybernetics de-escalation training system may include a device including a microphone, a video camera, and/or one or more physiological sensor devices. Additionally, at least one physiological sensor device may generate a signal associated with a physiological state experienced by the user. The biocybernetic de-escalation training system may include an augmented reality computing system, wherein presentation of an electronic representation of a psychophysiological stimuli via a virtualized environment comprises generating a simulation of the user interacting with one or more simulated individuals. In some cases, the augmented reality computing system comprises a virtual reality display. In some cases, the simulation of the user interacting with one or more simulated individuals is modified based on the user's physiological response to the simulation. In some cases, behavior of the one or more simulated individuals is modified based on whether the user's physiological response changes in response to real-time changes of the behavior of the one or more simulated individuals.

Another embodiment of the invention is a method comprising receiving, from at least one electronic device of a plurality of electronic devices, a first signal associated with a first physiological response of a user, identifying, based on the first signal, a first physiological pattern associated with the first physiological response of the user, comparing the first physiological pattern with a first pattern template associated with a particular interaction type, determining, based on the comparison of the first pattern template to the first physiological pattern, a closeness score, and causing, based on the closeness score and the first pattern template, presentation of an electronic representation of a psychophysiological stimuli via a virtualized environment. In some cases, the closeness score comprises a value indicative of a proximity of a user's actual moment-to-moment physiological and/or voice activity to a desirable pattern or an undesirable pattern. In some cases, the plurality of electronic devices associated with the user comprises a smart phone and/or at least one physiological sensor device. In some cases, the at least one physiological sensor device generates a signal associated with a physiological state experienced by the user. In some cases, the method further comprises generating, via an augmented reality computing system, a simulation of the user interacting with one or more simulated individuals. In some cases. behavior of the one or more simulated individuals is modified based on whether the user's physiological response changes in response to real-time changes of the behavior of the one or more simulated individuals.

Yet another embodiment of the invention is a computing device comprising at least one processor and memory storing instructions that, when executed by the at least one processor, cause the computing device to receive, from at least one electronic device of a plurality of electronic devices, a first signal associated with a first physiological response of a user, identify, based on the first signal, a first physiological pattern associated with the first physiological response of the user, determine, based on a comparison of a first pattern template to the first physiological pattern, a closeness score, and cause, based on the closeness score and the first pattern template, presentation of an electronic representation of a psychophysiological stimuli via a virtualized environment. In some cases, the electronic representation of a psychophysiological stimuli via a virtualized environment comprises behavior of one or more simulated individuals that is modified based on whether the user's physiological response changes in response to real-time behavior of the one or more simulated individuals.

These and other features, advantages, and objects of the present invention will be further understood and appreciated by those skilled in the art by reference to the following specification, claims, and appended drawings.

DETAILED DESCRIPTION OF THE INVENTION

Figure 1:
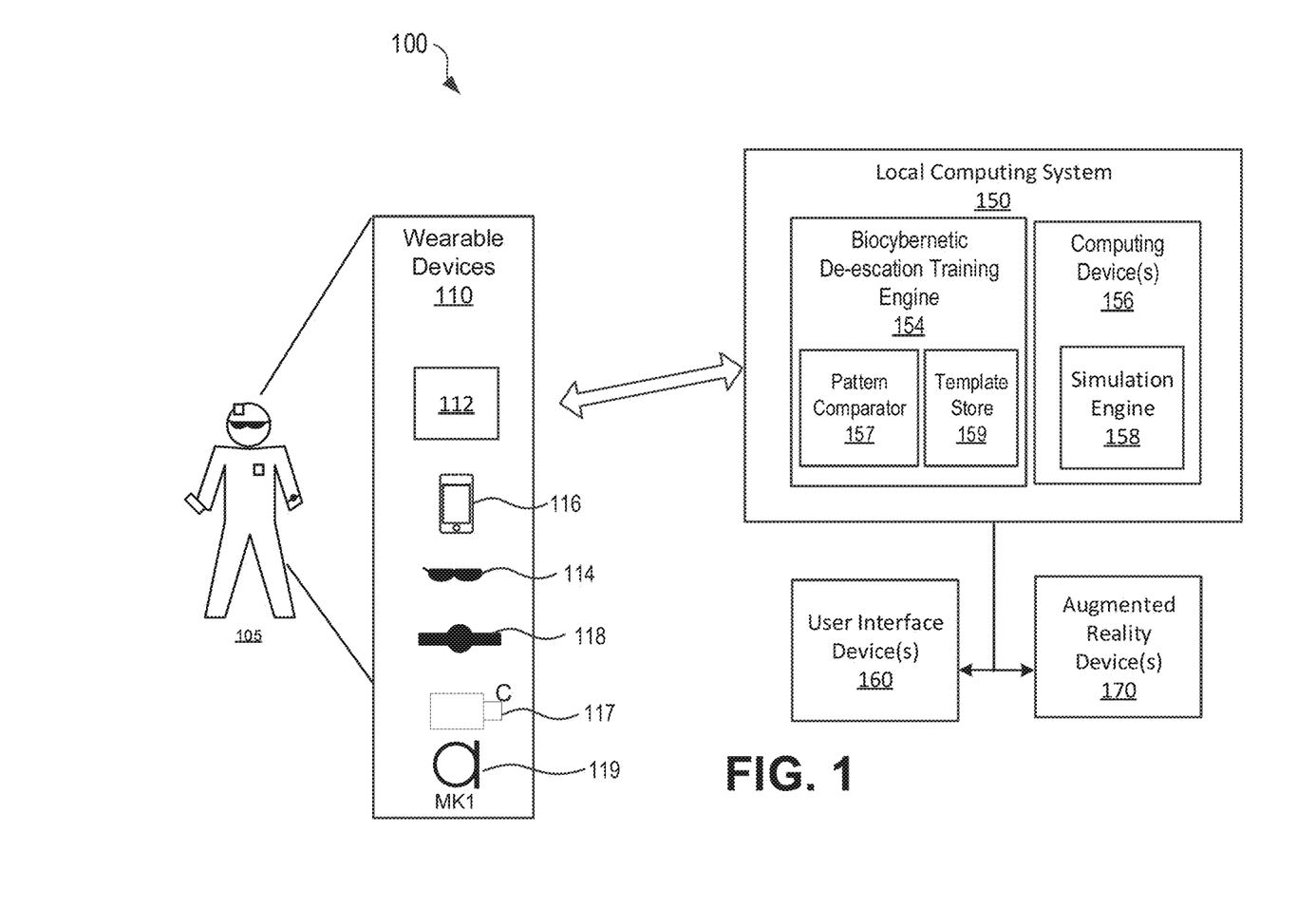
FIG. 1 is a block diagram of an illustrative biocybernetic de-escalation training system, according to aspects described herein.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 shows a block diagram of an illustrative biocybernetic de-escalation training system 100. The biocybernetic de-escalation training system 100 may include one or more wearable devices (e.g., one or more physiological sensors 112, a smart phone 116, smart glasses 114, a smart watch 118, etc.) that may be worn, carried, or otherwise utilized by a user 105. In some cases, the wearable devices may include separate and/or integrated cameras 117 and/or microphones 119. The one or more physiological sensors 112 may include heart rate monitors, blood pressure sensors, moisture sensors, accelerometers, neurological sensors, and the like. The wearable devices 110 may be in wired or wireless communication with a local computing system 150 (e.g., an environmental computing system) that may include a biocybernetic de-escalation training engine 154 that may be communicatively coupled to one or more computing devices 156. The biocybernetic training engine may include a pattern comparator 157 and a pattern template store 159 (e.g. a database, a file system, and the like). The one or more computing devices 156 may include one or more interactive computing devices providing a function, service, and/or other functionality to the user 105, such as a de-escalation training simulation generated by a simulation engine 158. For example, the local computing system may interact with the user 105 via one or more user interface devices 160 (e.g., a user command interface, a display device, gauges, switches, audio output devices, video output devices, lighting sensors, and/or the like). Additionally, the local computing system 150 may also incorporate one or more augmented reality devices, such as virtual reality displays, augmented reality devices (e.g., smart glasses).

One example embodiment may comprise two (or more) interacting sets of components. For example, one or more wearable and/or environment-embedded components that track an individual's physiological signals, compute estimates of their cognitive and emotional states and communicate the estimates to other computing components, that may provide a virtual, augmented, and/or mixed reality environment. The computing components may modify aspects of the virtual, augmented, and/or mixed reality environments based on information generated by the biocybernetic de-escalation training engine 154. The local computing system 150 may be configured to provide feedback to the user 105 regarding their cognitive and/or emotional states that is designed to encourage them to develop the ability to respond in future real environments with appropriately effective states.

To enable such systematic reinforcement, functional elements may work together to arrive at modifications of the virtual, augmented, and/or mixed reality environment characters' behavior and appearance. The pattern comparator 157 may store or otherwise access physiological pattern templates (e.g., pattern templates stored in the pattern template store 159) and continually calculate a value indicative of the proximity of the trainee's actual moment-to-moment physiological and/or voice activity to desirable and/or undesirable patterns. In some cases, such comparisons and/or calculations may occur in real-time. The templates used for reference in such comparison may be those determined by theory and/or testing as physiological patterns that are effective in a particular type and/or moment of interaction and may be based on prior measurement of the trainee's own physiology while in a desired state.

In some cases, the biocybernetic de-escalation training engine may generate or otherwise modify a pattern template based on analyzed data and feedback provided by the user based on user interaction with a related simulation generated by the simulation engine 158. The pattern comparator 157 calculates a closeness score to one or more reference patterns, and sends this information to the virtual, augmented, and/or mixed reality environment component, such as the simulation engine 158. The level or degree of threat or cooperation presented by another character and/or other characters within the simulation may be programmed within the simulation engine 158 to vary in a predetermined way in response to the closeness score.

In an illustrative implementation, a virtual, augmented, and/or mixed reality scenario may be initiated in which a police officer trainee, which may be digitally represented via a trainee's avatar controlled by the police officer trainee (e.g., the user 105) via one or more user interface devices 160, interacts with a civilian character or characters in a simulation of the trainee officer's interactions in the line of duty. The simulated interaction(s) may be based at least in part, on actual real-life past interactions that the trainee and/or other individuals have encountered. In certain embodiments, the interaction is purely fictitious. In certain embodiments, different aspects of the interaction may be modified. Example non-limiting parameters that may be modified by one or more end users (and/or by AI or other methods) may include: ambient background noise, lighting, time of day, volume of noises, including voices from other characters, speed of objects, such as other characters or vehicles, initial aggression or proximity or rate of proximity closure for aggressive characters, among others. The civilian character(s), which may be controlled by the simulation engine 158, may initially exhibit agitated behavior and/or be verbally abusive or physically aggressive within a certain time frame or upon occurrence of one or more virtual events. This may, in turn, may begin to be modulated by the trainee's physiological responses. The trainee's responses may represent various cognitive and emotional states such as, for example, calm, equanimity, anxiety, autonomic arousal, and/or anger, amongst others, such as as identified via the one or more sensors, such as the wearable devices 110. In one embodiment, all data is obtained from wearable devices, yet in other embodiment, a portion of the data is obtained from wearable devices, and still yet in another embodiment none of the data is obtained from the wearable devices.

As one example embodiment, as the trainee engages verbally, gesturally and/or in other ways with the character and/or the environment, the character's behavior may become less agitated and more compliant and cooperative as the trainee's physiological response reflects calm and equanimity for a prespecified period of time, requiring the trainee to remain calm for that limited period of continued threat. In one embodiment, the period of time is not predefined. In one embodiment the time duration is dependent on the level of calmness of the trainee, for example, if sensor data indicates a first threshold state of calmness has been reached, the duration of time may be tolled at a different rate that if a second threshold state of calmness has been reached. Those skilled in the art will understand that the determination may be multifactorial. For example, if the trainee is in a first scenario with a first level of difficulty, the first or second threshold may be adjusted. Further, the thresholds and/or rate of adjusting durations may not be static for the same trainee during different simulations. This may be the case even for restarting the same scenario for the trainee.

In one embodiment, if the trainee's physiological response, as identified via one or more sensors, such as for example, via the wearable devices 110 (which may include physiological signals, visual cues identified from images or video, and/or audio feedback), is determined by the system to reflect one or more threshold levels of anxiety, autonomic arousal, anger, or combinations thereof, the character may be programmed to continue to be agitated or becomes more agitated in accordance with one embodiment.

An embodiment may involve a similar dynamic interaction in a virtual, augmented, and/or mixed reality environment, but with the different scenario of a soldier (e.g., the user 105) managing an encounter with a civilian. In one example scenario, the character or characters in a virtual, augmented, and/or mixed reality environment may include agitated protestors and/or hostile antagonists. As the soldier engages verbally, gesturally and in other ways with the protestors, the protestors' behavior may become less threatening and more compliant and cooperative as the soldier's physiological response reflects at least one of a minimum duration and/or threshold level of measured readings associated with calm and/or equanimity, requiring the soldier to remain calm or achieve a level of determined calmness for that limited period of perceived antagonistic behavior. For this and the other embodiments herein, the level and duration and/or periodicity of the antagonistic behavior may be adjusted.

In one embodiment, a threshold level of a reversal in the user's calmness or other parameters, such as if the user's physiological response reflects anxiety, autonomic arousal, or anger at a certain threshold and/or duration, the system may be configured such that the perceived antagonist continues to be aggressive or becomes more aggressive or changes types of aggression in certain embodiments.

These or other embodiments may involve the simulation engine 158 simulating different characters, environments, and/or scenarios. For example, one may include one or more individuals (e.g., the user 105) of an airline flight crew, such as pilots and/or flight attendants, and customer service personnel (e.g., gate agents) interacting with a virtual, augmented, and/or mixed reality environment, to train the airline crew and/or customer service personnel in managing unruly passengers, either as a group or individually and/or other stressful situations in which they may encounter as part of performing their jobs. Training scenarios including a character or characters in the virtual, augmented, and/or mixed reality environment could present trainees with noncompliant and/or hostile passengers. As the user engages verbally, gesturally and in other ways with the passenger, the passenger's behavior may become less unruly and more compliant and cooperative as the trainee's physiological response reflects calm and equanimity for a prespecified period of time and/or threshold level, requiring the trainee to remain calm or become calm for a limited period of continued disruption. If the trainee's physiological response reflects a threshold level and/or duration of anxiety, autonomic arousal or anger, the passenger continues to be disruptive or becomes more disruptive. In some cases, a user 105 may interact individually with the output from the simulation engine 158.

Another example embodiment may involve a similar dynamic interaction in a virtual, augmented, and/or mixed reality environment, but with the different scenario of a classroom teacher managing student behavior. In this scenario the character or characters in the virtual, augmented, and/or mixed reality environment may include unruly students and/or a misbehaving, possibly hostile, student. As the teacher (e.g., user 105) engages verbally, gesturally and in other ways with the student or students, such as measured to meet one or more thresholds and/or durations, the student's behavior becomes less unruly and more compliant and cooperative as the teacher's physiological response reflects calm and equanimity for a prespecified period of time or threshold levels, requiring the teacher to remain calm or become calm for a period of continued disruption. If the teacher's physiological response reflects a duration and/or threshold level of anxiety, autonomic arousal, and/or anger, such as via electronic feedback received by the biocybernetic de-escalation training engine 154, the student continues to be disruptive or becomes more disruptive.

Figure 2:
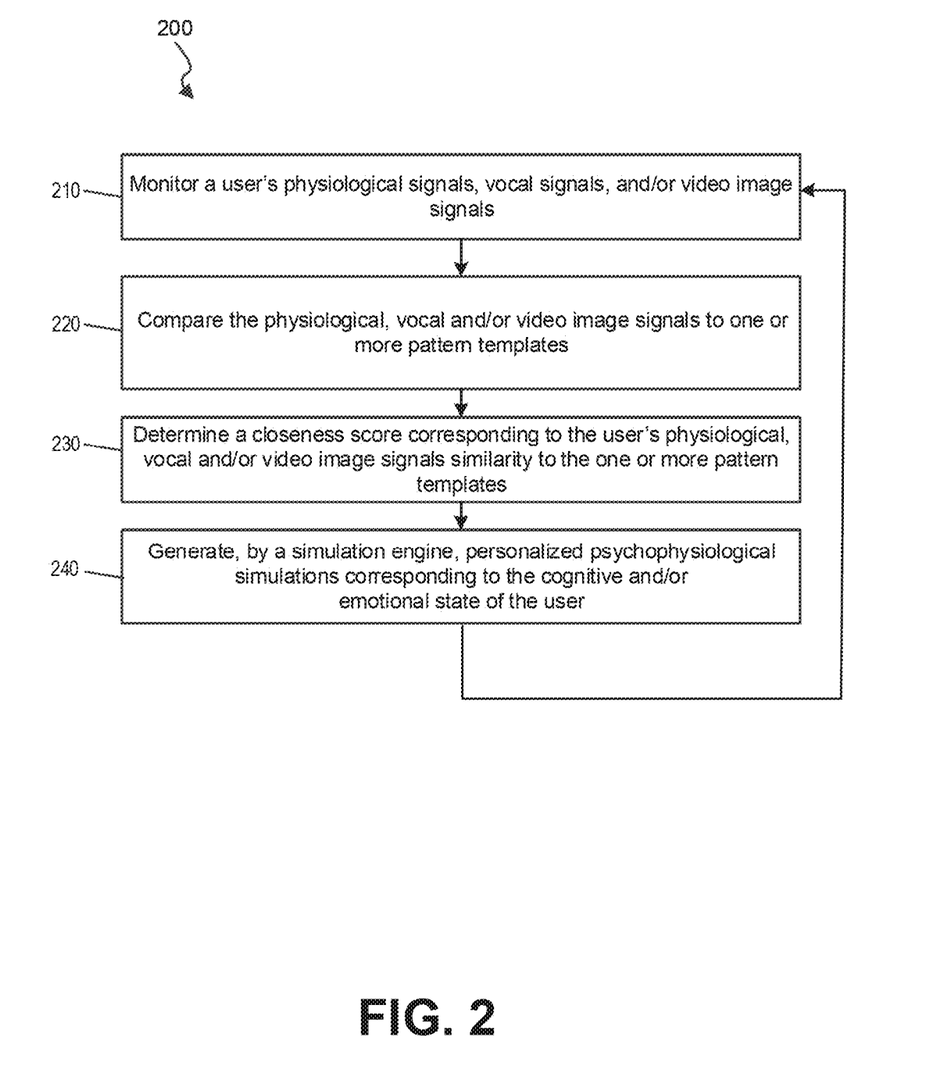
FIG. 2 is an illustrative method for providing biocybernetic training, according to aspects described herein.

Aspects relate to biocybernetics de-escation techniques. FIG. 2 shows an illustrative biocybernetics de-escalation training method 200 that may be incorporated into one or more embodiments of the novel methods and systems disclosed herein. A user's neurophysiological responses to cognitive and/or emotional state-inducing environmental stimuli via simulations generated by the simulation engine 158 may be monitored (See, e.g., block 210). In one embodiment, at least a portion of the responses are obtained via one or more wearable devices 110 and/or one or more environmental devices, which may be communicatively coupled to the wearable devices 110. In some cases, sensors may capture audio signals, video signals, and/or physiological signals associated with autonomic responses of the user 105 to external stimuli, such as a virtual, augmented, or mixed reality-based simulation of a real-world environment. The monitoring may be performed in real-time or near real-time.

A biocybernetics de-escalation training engine, such as engine 154, may identify patterns in the one or more physiological, audio, video, and/or sensor signals and compare the identified patterns with one or more pattern templates corresponding to characteristics of the user's behavior (See, e.g., block 220). In some cases, each pattern may be associated with a range or value with respect to a particular signal or groupings of signals. For example, a pattern template may represent a characteristic range or value of heartrate and/or breathing pattern associated with a user mood, behavior, and/or cognitive and/or emotional state. The pattern template may be specific to the user, or a group of users (e.g., values of users of within the same category of age, weight, sex, and/or other parameters. Other example non-limiting patterns may be representative of movement patterns, facial feature patterns, neurological signal patterns, and/or the like. In some cases, the biocybernetic de-escalation training engine 154 may, over time, adjust or modify an existing pattern template such as to personalize a calculated pattern template to a particular user or group of users. In some cases, the biocybernetic de-escalation training engine, such as engine 154, may generate a new pattern template associated with characteristic behaviors associated with a particular user or group of users, based on personalized reactions to certain stimuli, or simulated situations and/or personal interactions.

A biocybernetic de-escalation training engine, such as engine 154, may determine a closeness score corresponding to the user's physiological, vocal, and/or visual image signals with respect to one or more pattern templates (see, e.g., block 230). For example, a pattern comparator 157 may calculate a closeness score with respect to one or more reference patterns retrieved from the pattern template store 159. Once generated, the biocybernetic de-escalation training engine 154 may send the closeness score and/or information corresponding to the user's physiological, cognitive, and/or emotional state to the simulation engine 158. A simulation engine, such as simulation engine 158, may generate a simulated activity and/or interaction setting that is presented via the virtual, augmented, and/or mixed environment computing devices (see, e.g., block 240). For example, a level or degree of threat or cooperation presented by the other characters in the simulation is programmed to vary in a predetermined way in response to the closeness score, as discussed with respect to the various examples. The biocybernetic de-escalation training system and methods may be integrated into virtual training systems, games, and/or other interactive applications to create experiential interactions that provide stronger, more emotionally connected, and interactive experiences that provide individuals with real-time feedback with respect to their cognitive and/or emotional states in various stressful or emotional situations.

Certain methods, such as method 200 of FIG. 2, may be incorporated into the system 100 and may include two or more interacting sets of components. For example, a first set of components may include wearable or environment-embedded components that track an individual's physiological (e.g., brainwave, heart rate), voice (e.g., loudness, pitch, tempo) signals, and/or video (e.g., gestures, expressions), and compute estimates of their cognitive and emotional states and communicate the estimates to other components associated with a virtual, augmented, and/or mixed interactive environments, that modify aspects of the virtual, augmented, and/or mixed interactive environments. The system provides feedback to the individual regarding their states that is designed to encourage them to develop the ability to respond in future real environments with appropriately effective states.

To enable such systematic reinforcement, functional elements may work together to arrive at modifications of the virtual/augmented/mixed environment character's behavior and/or functionality. A pattern comparator may store or otherwise accesses physiological, video, and/or voice pattern templates and continually calculates a value indicative of the proximity of the individual's actual moment-to-moment physiological and/or voice activity to desirable and/or undesirable patterns. The templates used for reference in such comparison may be those determined by theory and/or testing as physiological and/or voice patterns that are effective in a particular type and moment of interaction and may be based on prior measurement of the individual's own physiology and/or voice while in a desired state. The pattern comparator may calculate a closeness score to one or more reference patterns, and sends this information to the virtual/augmented/mixed environment component. The level or degree of threat or cooperation presented by the other characters in the simulation is programmed to vary in a predetermined way in response to the closeness score.

One example embodiment may comprise a virtual/augmented/mixed reality scenario in which an individual (e.g., a returning war veteran) or the individual's avatar interacts with a character or characters representing persons in their daily life. In the veteran's daily life encounter, the virtual, augmented, and/or mixed reality character(s) may be programmed to initially exhibit what will be perceived as agitated behavior, such as what may be determined to be perceived as being verbally abusive and/or physically aggressive, which then begins to be modulated by the veteran's physiological and/or voice responses.

The veteran's responses represent cognitive and emotional states such as, for example, anxiety, calm, autonomic arousal, and/or anger. As the veteran engages verbally, gesturally and in other ways with the character, the character's behavior becomes less agitated and more compliant and cooperative as the veteran's physiological and/or voice response reflects calm and/or equanimity at a first threshold and/or for a duration of time, requiring the veteran to remain or become calm for that period of perceived threat or otherwise undesirable scenario. If the veteran's physiological and/or voice response reflects anxiety, autonomic arousal or anger, the character may be programed to continue to be, or becomes more, agitated. However, for this and all examples discussed herein, sensor readings indicative of a possible adverse health reaction and/or reaching an elevated state of mental anguish or discomfort, may reduce and/or entirely eliminate the threat and/or hostile actions presented to the user.

Another embodiment may involve a similar dynamic interaction in virtual, augmented, and/or mixed reality, but with a different scenario of a veteran managing an encounter with an unfamiliar civilian. In this scenario the character or characters in virtual, augmented, and/or mixed reality may include at least one antagonistic civilian. As the veteran engages verbally, gesturally and in other ways with the civilian, the civilian's behavior becomes less threatening and more compliant and cooperative as the veteran's physiological and/or voice response reflects calm and/or equanimity for a prespecified period of time and/or meeting a threshold level of calmness and/or equanimity, requiring the veteran to remain calm for that limited period of continued antagonistic behavior. If the veteran's physiological and/or voice response reflects anxiety, autonomic arousal or anger, the antagonist continues to be, or becomes more aggressive and/or initiates a different form of aggression.

Figure 3:
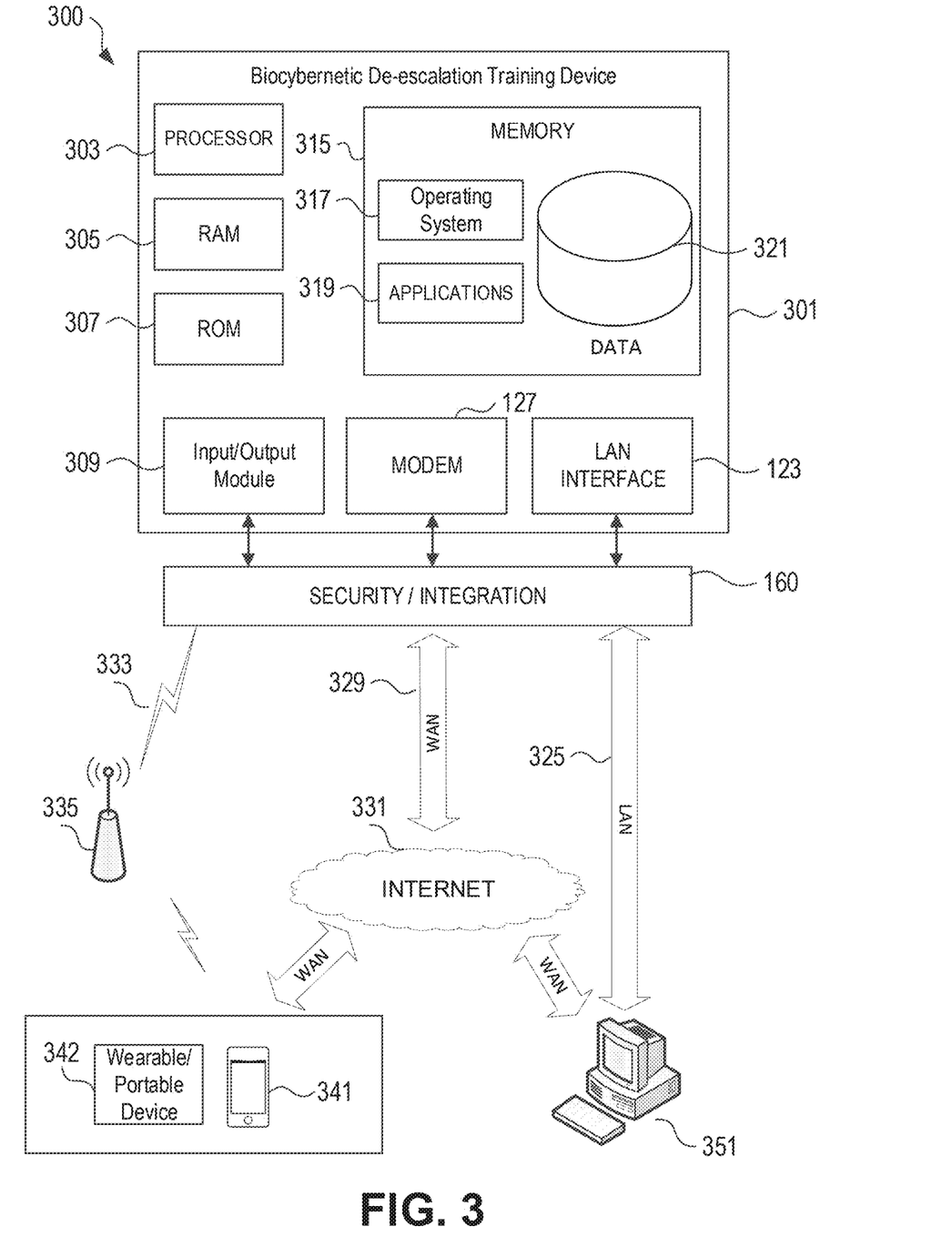
FIG. 3 is an illustrative operating environment in which various aspects of the disclosure may be implemented in accordance with one or more aspects described herein.

FIG. 3 shows an illustrative operating environment 300 in which various aspects of the present disclosure may be implemented in accordance with one or more example embodiments. Referring to FIG. 3, a computing system environment 300 may be used according to one or more illustrative embodiments. The computing system environment 300 is only one example of a suitable computing environment and is not intended to suggest any limitation as to the scope of use or functionality contained in the disclosure. The computing system environment 300 should not be interpreted as having any dependency or requirement relating to any one or combination of components shown in the illustrative computing system environment 300.

The computing system environment 300 may include an illustrative biocybernetic de-escalation training Device 301 having a processor 303 for controlling overall operation of the biocybernetic de-escalation training device 301 and its associated components, including a Random-Access Memory (RAM) 305, a Read-Only Memory (ROM) 307, a communications module 309, and a memory 315. The biocybernetic de-escalation training device 301 may include a variety of computer readable media. Computer readable media may be any available media that may be accessed by the biocybernetic de-escalation training device 301, may be non-transitory, and may include volatile and nonvolatile, removable, and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the biocybernetic de-escalation training device 301.

Although not required, various aspects described herein may be embodied as a method, a computing (e.g., data transfer) system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 303 of the biocybernetic de-escalation device 301. Such a processor may execute computer-executable instructions stored on a computer-readable medium.

Software may be stored within the memory 315 and/or other digital storage to provide instructions to the processor 303 for enabling the biocybernetic de-escalation training device 301 to perform various functions as discussed herein. For example, the memory 315 may store software used by the biocybernetic de-escalation device 301, such as an operating system 317, one or more application programs 319 (e.g., a web browser application), and/or an associated database 321. In addition, some, or all of the computer executable instructions for the biocybernetic de-escalation training device 301 may be embodied in hardware or firmware. Although not shown, the RAM 305 may include one or more applications representing the application data stored in the RAM 305 while the biocybernetic de-escalation training device 301 is on and corresponding software applications (e.g., software tasks) are running on the biocybernetic de-escalation training device 301.

The communications module 309 may include a microphone, a keypad, a touch screen, and/or a stylus through which a user of the biocybernetic de-escalation training device 301 may provide input, and may include one or more of a speaker for providing audio output and a video display device for providing textual, audiovisual, and/or graphical output. The computing system environment 300 may also include optical scanners (not shown).

The biocybernetic de-escalation training device 301 may operate in a networked environment supporting connections to one or more remote computing devices, such as the computing devices 341, 342, and 351. The computing devices 341, 342, and 351 may be wearable computing devices, personal computing devices or servers that include any or all of the elements described above relative to the biocybernetic de-escalation training device 301.

The network connections depicted in FIG. 3 may include a Local Area Network (LAN) 325 and/or a Wide Area Network (WAN) 329, as well as other networks. When used in a LAN networking environment, the biocybernetic de-escalation training device 301 may be connected to the LAN 325 through a network interface or adapter in the communications module 309. When used in a WAN networking environment, the biocybernetic de-escalation training device 301 may include a modem in the communications module 309 or other means for establishing communications over the WAN 329, such as a network 331 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

What is claimed is:

1. A biocybernetic de-escalation training system comprising:
   a plurality of electronic devices associated with a user, wherein each electronic device of the plurality of electronic devices generate a signal associated with a physiological response of the user;
   a computing device comprising:
      at least one processor; and
      a non-transitory memory storing computer-executable instructions that, when executed by the at least one processor, cause the computing device to:
         receive from at least one electronic device of the plurality of electronic devices, a first signal associated with a first physiological response of the user;
         identify, based on the first signal, a first physiological pattern associated with the first physiological response of the user;
         determine, based on a comparison of a first pattern template to the first physiological pattern, a closeness score; and
         cause, based on the closeness score, presentation of an electronic representation of a psychophysiological stimuli via a virtualized environment; and
   an augmented reality computing system and wherein presentation of an electronic representation of a psychophysiological stimuli via a virtualized environment comprises generating a simulation of one or more simulated individuals with which the user interacts in the virtualized environment,
   wherein the simulation of the one or more simulated individuals with which the user interacts is modified based on the user's physiological response to the simulation,
   wherein the closeness score comprises a value indicative of a proximity of a user's actual moment-to-moment physiological and voice activity to a desirable pattern or an undesirable pattern,
   wherein behavior of the one or more simulated individuals is modified to a first type of behavior based on the closeness score indicating the desirable pattern, and is modified to a second type of behavior based on the closeness score indicating the undesirable pattern.

2. The system of claim 1, wherein the first physiological response of the user comprises at least one of a cognitive response and an emotional response.

3. The system of claim 1, wherein the first type of behavior is undesirable behavior, and the second type of behavior is desirable behavior.

4. The system of claim 1, wherein the plurality of electronic devices associated with the user comprises a microphone.

5. The system of claim 1, wherein the plurality of electronic devices associated with the user comprises one or more physiological sensor devices.

6. The system of claim 5, wherein at least one physiological sensor device generates a signal associated with a physiological state experienced by the user.

7. The system of claim 5, wherein at least one physiological sensor device comprises a video camera.

8. The system of claim 1, wherein the augmented reality computing system comprises a virtual reality display.

9. A method comprising:
   receiving, from at least one electronic device of a plurality of electronic devices, a first signal associated with a first physiological response of a user;
   identifying, based on the first signal, a first physiological pattern associated with the first physiological response of the user;
   comparing the first physiological pattern with a first pattern template associated with a particular interaction type;
   determining, based on the comparison of the first pattern template to the first physiological pattern, a closeness score;
   causing, based on the closeness score, presentation of an electronic representation of a psychophysiological stimuli via a virtualized environment, and
   generating, via an augmented reality computing system, a simulation of one or more simulated individuals with which the user interacts in the virtualized environment,
   wherein the simulation of the one or more simulated individuals with which the user interacts is modified based on the user's physiological response to the simulation
   wherein the closeness score comprises a value indicative of a proximity of a user's actual moment-to-moment physiological and or voice activity to a desirable pattern or an undesirable pattern,
   wherein behavior of the one or more simulated individuals is modified to a first type of behavior based on the closeness score indicating the desirable pattern, and is modified to a second type of behavior based on the closeness score indicating the undesirable pattern.

10. The method of claim 9, wherein the first type of behavior is undesirable behavior, and the second type of behavior is desirable behavior.

11. The method of claim 9, wherein the plurality of electronic devices associated with the user comprises a smart phone.

12. The method of claim 10, wherein the plurality of electronic devices associated with the user comprises at least one physiological sensor device.

13. The method of claim 12, wherein the at least one physiological sensor device generates a signal associated with a physiological state experienced by the user.

14. A computing device comprising:
   at least one processor;
   memory storing computer-executable instructions that, when executed by the at least one processor, cause the computing device to:
      receive, from at least one electronic device of a plurality of electronic devices, a first signal associated with a first physiological response of a user;
      identify, based on the first signal, a first physiological pattern associated with the first physiological response of the user;
      determine, based on a comparison of a first pattern template to the first physiological pattern, a closeness score;
      cause, based on the closeness score, presentation of an electronic representation of a psychophysiological stimuli via a virtualized environment, and generate, via an augmented reality computing system, a simulation of one or more simulated individuals with which the user interacts in the virtualized environment, wherein the simulation of the one or more simulated individuals with which the user interacts is modified based on the user's physiological response to the simulation wherein the closeness score comprises a value indicative of a proximity of a user's actual moment-to-moment physiological and or voice activity to a desirable pattern or an undesirable pattern, wherein behavior of the one or more simulated individuals is modified to a first type of behavior based on the closeness score indicating the desirable pattern, and is modified to a second type of behavior based on the closeness score indicating the undesirable pattern.

15. The computing device of claim 14, wherein the first type of behavior is undesirable behavior, and the second type of behavior is desirable behavior.

* * * * *